May 5, 1942.    R. BALMER    2,281,821
DIESEL ENGINE AND GAS COMPRESSOR COMBINATION
Filed Feb. 8, 1938    3 Sheets-Sheet 1
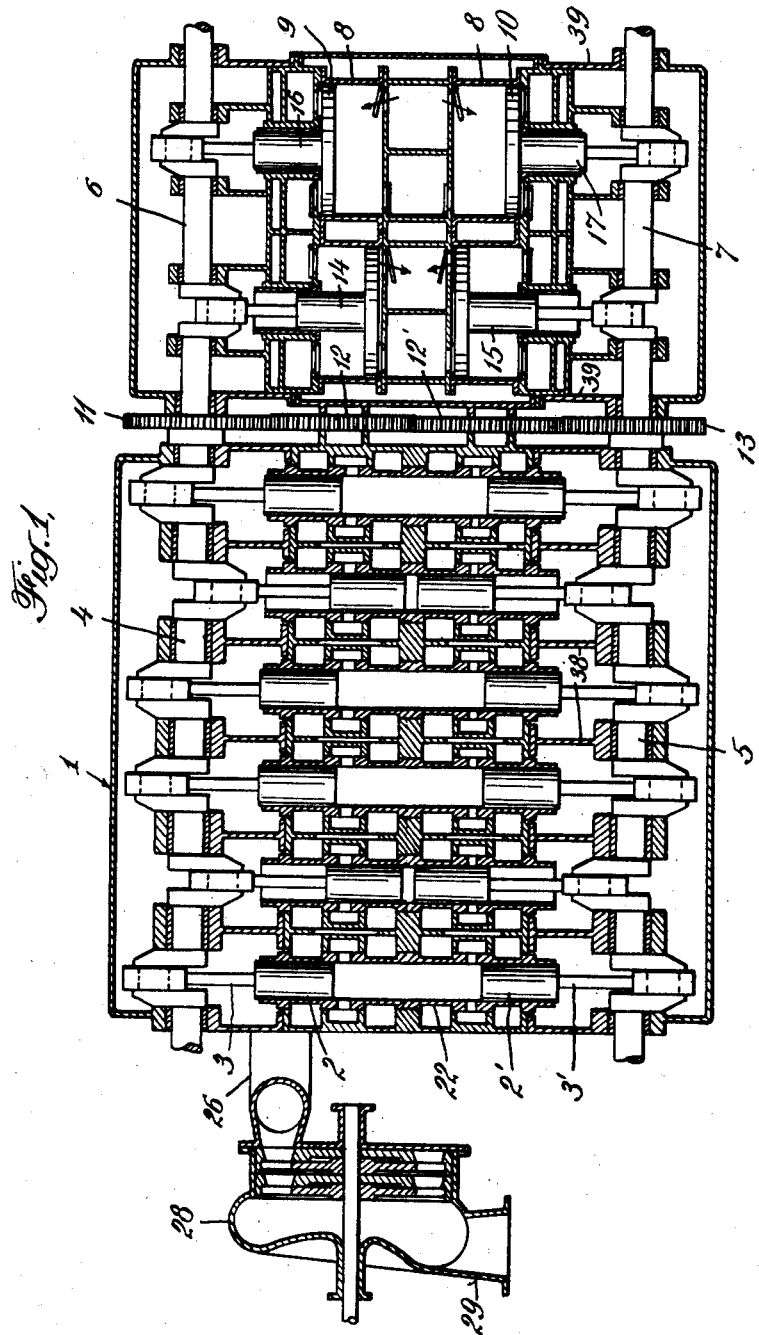
INVENTOR
*Richard Balmer*
BY
*Pennie, Davis, Marvin & Edmonds*
ATTORNEYS

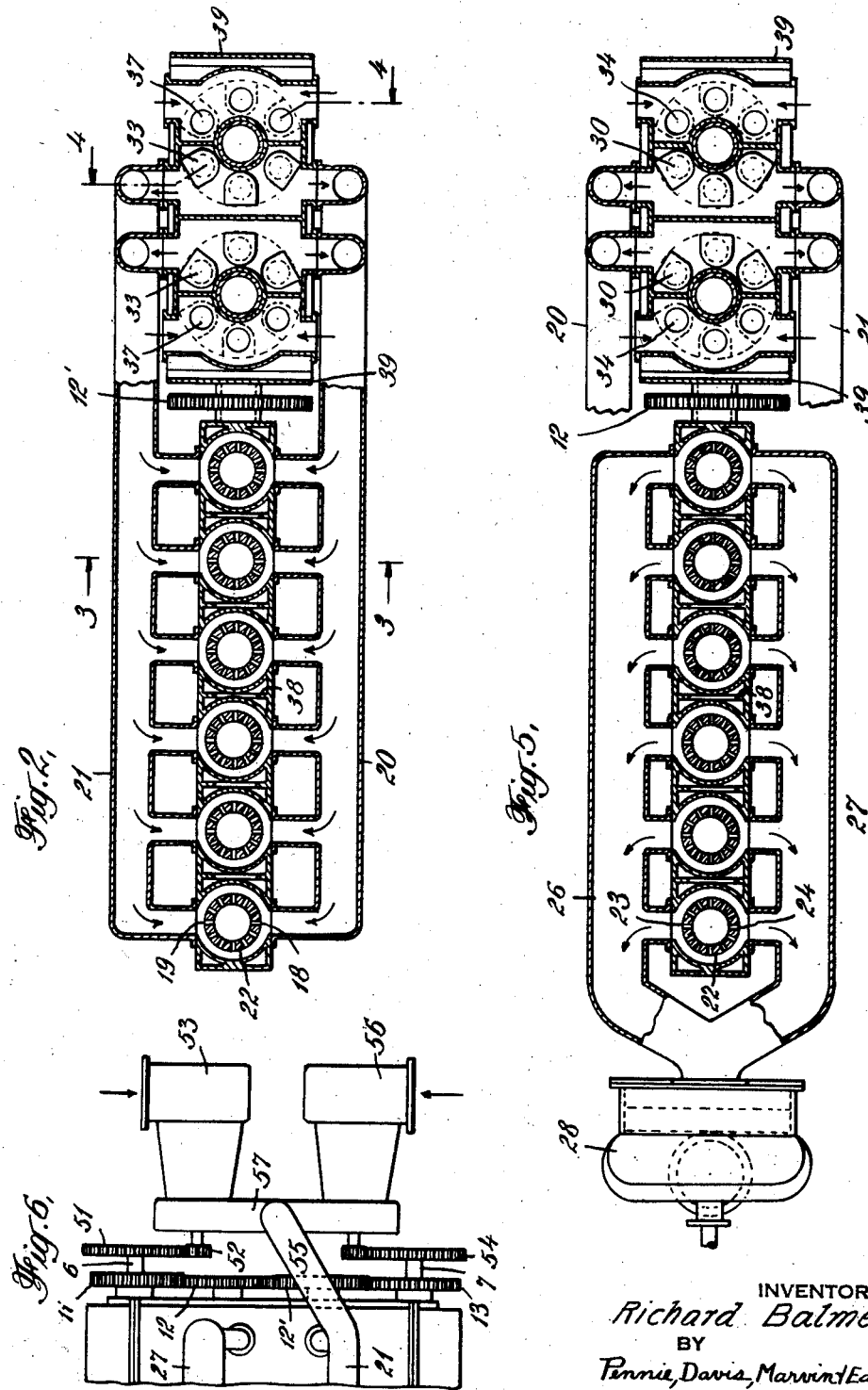

May 5, 1942.     R. BALMER     2,281,821
DIESEL ENGINE AND GAS COMPRESSOR COMBINATION
Filed Feb. 8, 1938     3 Sheets-Sheet 3
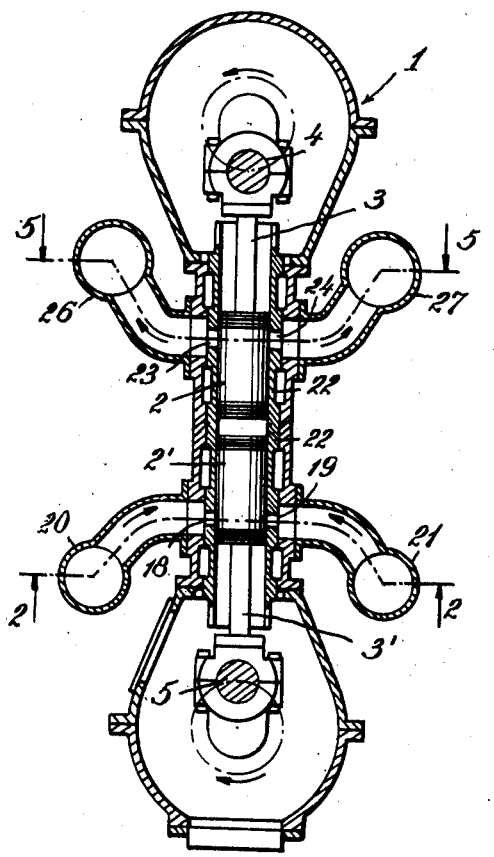
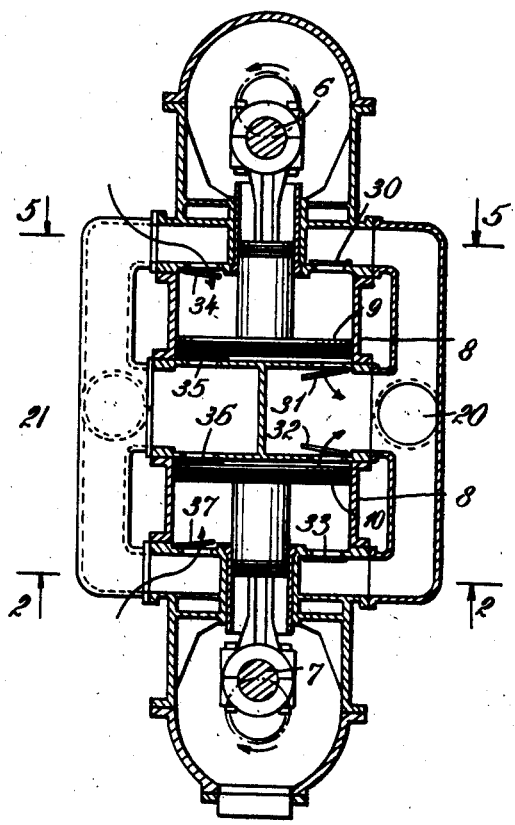
INVENTOR
*Richard Balmer*
BY
*Pennie, Davis, Marvin & Edmonds*
ATTORNEYS Patented May 5, 1942

2,281,821

UNITED STATES PATENT OFFICE 2,281,821

DIESEL ENGINE AND GAS COMPRESSOR COMBINATION

Richard Balmer, Winterthur-Seen, Switzerland, assignor to Sulzer Freres Societe Anonyme, Winterthur, Switzerland Application February 8, 1938, Serial No. 189,392
In Switzerland February 12, 1937

4 Claims. (Cl. 230—56)

This invention relates to power units consisting of at least one installation for supplying gas under pressure for power purposes and at least one secondary engine employing such power gas, of the kind comprising a two-crankshaft opposed piston Diesel engine and compressing apparatus driven by the Diesel engine. For the sake of convenience the gas supplied under pressure by the installation will be hereinafter referred to as the power gas.

By "a two-crankshaft opposed piston Diesel engine" is to be understood a Diesel engine comprising two spaced parallel crankshafts with one or more cylinders lying in the space between them and each containing two pistons connected respectively to the two crankshafts which rotate at the same speed and are so geared together that the pistons in each cylinder move in phase but in opposite directions.

In power plant of the above kind according to the present invention employing reciprocating compressors, the forces produced by the rotating parts both of the Diesel engine and of the compressors are balanced and the compressor pistons as well as the Diesel engine pistons are arranged in pairs, the two pistons in each pair moving in phase but in opposite directions while the two crankshafts have equal rotary momentum but rotate in opposite directions.

When, instead of reciprocating compressors, rotary compressors are employed, for example gear wheel, centrifugal or axial flow compressors, the sum of the products of velocity and the moments of inertia of all the main rotating parts of the installation is zero.

Where each compressor is of the reciprocating piston type it is preferred, in order to obtain good balancing of the compressing apparatus, to make each compressor double-acting. Further, in both the Diesel engine and the compressing apparatus the sum of the products produced by multiplying the moments of inertia of the various rotating parts by the angular speed is preferably zero.

In any case, the power absorbed by the compressor driven from one crankshaft is equal or approximately equal to that absorbed by the compressor driven from the other crankshaft for all time differentials.

Thus, the installation as a whole does not during operation produce any substantial unbalanced forces even during acceleration or deceleration.

One construction according to the invention is illustrated by way of example in the accompanying drawings, in which Figure 1 is a partial vertical section of the installation in the plane of the crankshaft axes of an embodiment of the invention;

Figure 2 is a horizontal sectional view along the lines 2—2 of Figures 3 and 4;

Figure 3 is a vertical sectional view along the line 3—3 of Figure 2;

Figure 4 is a vertical sectional view along the line 4—4 of Figure 2;

Figure 5 is a horizontal sectional view along the lines 5—5 of Figures 3 and 4; and Figure 6 is a fragmental vertical view of a modification of apparatus embodying the invention.

In the construction illustrated, the installation comprises a Diesel engine 1 having a number of parallel cylinders each containing two oppositely moving pistons 2, 2' connected by gudgeon pins and connecting rods 3, 3' respectively to an upper crankshaft 4 and a lower crankshaft 5 which are parallel to one another.

The crank shafts 4 and 5 are extended as shown at 6 and 7 to drive gas compressing apparatus 8 comprising at least one pair of individual compressors arranged as shown at 9 and 10 between and driven respectively from the extensions 6 and 7 of the crankshafts and absorbing the whole of the power of the Diesel engine. Thus the compressors, four of which are shown in the drawings, are arranged in pairs so that the pistons 14, 15 or 16, 17 of each opposed pair of compressors move in phase but in opposite directions.

Extending between the two crankshafts in a plane between the Diesel engine and the compressors is a train of gearing 11, 12, 12', 13 which synchronises the two crankshafts so that they rotate at the same speed but in opposite directions with the pistons in each Diesel engine cylinder and in each opposed pair of compressor cylinders moving in phase but in opposite directions.

In the arrangement illustrated, the Diesel engine comprises six cylinders, the rotating and reciprocating parts being arranged so that the centrifugal and inertia forces are balanced in known manner. The compressors are also arranged so that the centrifugal and inertia forces produced by their moving parts counterbalance one another.

The bearings for the crankshafts 4 and 5 and their extensions 6 and 7 are conveniently tied together by means of tie bolts indicated at 38 and 39 in Figure 2.

The Diesel engine is of a generally known type in which air inlet or scavenging ports 18 and 19 are forced in each cylinder 22 so as to be uncovered by the lower piston 2' at the end of its outstroke while exhaust ports 23, 24 are formed in the cylinder so as to be uncovered by the piston 2 at the end of its outstroke. The inlet ports 18 and 19 communicate with air admission pipes 20, 21 while power gas constituted by the exhaust gases and any excess scavenging air pass from the ports 23, 24 through pipes 26 and 27 to a secondary engine, for example, to a turbine 28 as shown in Figures 1 and 2, from which the gases then pass through an exhaust pipe 29.

The pipes 20, 21 communicate with the delivery side of the compressors which are constructed as shown in Figures 4 and 5. Thus, as shown in Figure 4 which illustrates one opposed pair of the compressors at the end of the delivery strokes of their adjacent chambers, the compressors are of the double-acting type and are provided with valve-controlled delivery ports 30, 31, 32, 33 leading through a suitable passage into the pipes 20, 21 and with valve-controlled inlet ports 34, 35, 36, 37 communicating with the atmosphere, these valves opening and closing during the required periods in known manner. As indicated in Figure 5, the inlet ports (indicated by the reference number 37) of one opposed pair of compressors are disposed on the side thereof remote from the inlet ports 37 of the other opposed pair of compressors so that the delivery ports of all the compressors lie adjacent to one another whereby communication between these ports and the pipes 20, 21 is facilitated.

When instead of reciprocating compressors rotary compressors are used, for example compressors of the gear wheel, centrifugal or axial flow type, as shown in Figure 6 the sum of the products produced by multiplying the moments of inertia by the angular speed of all the main rotating parts in the engine is made equal to zero and the power absorbed by the compressors driven by one of the crankshafts is equal or substantially equal to that absorbed by the compressors driven by the other crankshaft at any moment. As shown in Figure 6, the extended shaft 6 drives through gears 51 and 52 the axial flow or radial compressor 53 and the shaft 7 drives through gears 54 and 55 the axial flow or radial compressor 56. These compressors supply air under pressure to a common conduit 57 which connects with pipes 20 and 21.

It will be seen that the invention provides an installation which has substantially no unbalanced forces, whether tending to cause the engine to rock or torsional forces, even during acceleration or deceleration. Up to the present this property has only been possessed by installations of the free-stroke piston type, that is to say of the type in which the stroke of each piston is not controlled by a crankshaft or equivalent device.

Further, the load on the intermediate gearing used in the present invention for synchronising the crankshafts is zero during normal working, which is not the case with known two-crankshafts opposed piston engines, while further the pressure of the power gas can be maintained, at full load, at least four atmospheres.

Again, with a free-stroke piston power gas producing installation the distance apart of the individual cylinders is determined by the diameter of the compressor cylinders and if the pressure of the power gas required is more than 4 atmospheres, the diameter of the compressor cylinders will increase relatively to that of the Diesel engine cylinders. For instance, if power gas is required at 6 atmospheres, the diameter of the compressor cylinders will be about three times that of the Diesel cylinders, with the result that a considerable amount of useless space must be left between the Diesel cylinders. Thus, an installation in which the Diesel cylinders are separated from the compressor cylinders and placed close to one another, as in the present invention, gains an advantage in reduced space, weight and cost of production over free-stroke piston installations when the pressure of the power gas required exceeds a lower limit of 4 atmospheres and this advantage becomes the greater, the higher the pressure required for the power gas.

With the present invention, the combustion chamber of each Diesel cylinder can readily be made of such dimensions that even at the full pressure of 4 atmospheres for the power gas, the compression pressures in the Diesel cylinder does not exceed 120 atmospheres.

Special arrangements may be made such as throttling of the exhaust from the Diesel engine, the use of sparking plugs and throttling or preheating of the scavenging air to facilitate starting of the Diesel engine or operation thereof on reduced loads.

I claim:

1. A Diesel engine and compressor combination for producing power-gas which comprises a two-shaft opposed-piston two-stroke Diesel engine, at least one compressor piston mounted on each shaft of the engine, said compressor pistons being arranged in pairs and to move in opposite directions, said shafts being connected together by a train of gears which synchronizes the shafts causing them to rotate at the same speeds but in opposite directions, the compressor pistons of one pair being so mounted on the shafts as to move in opposite directions to the pistons of at least one pair of pistons of the engine.

2. A Diesel engine and compressor combination for producing power-gas which comprises a two-shaft opposed-piston, two-stroke Diesel engine, a separate rotary compressor driven by each shaft, each of said compressors being constructed and arranged so that the sum of the products of angular velocity and the moments of inertia of all the main rotating parts of the engine and compressor is zero, said shafts being connected together by a train of gears which synchronizes the shafts causing them to rotate at the same speeds but in opposite directions, and conduit means for receiving gas under pressure from the rotary compressors.

3. A Diesel engine and compressor combination for producing power-gas which comprises a two-shaft opposed-piston two-stroke Diesel engine, at least one compressor piston mounted on each shaft of the engine, said compressor pistons being arranged in pairs and to move in opposite directions, said shafts being connected together by a train of gears which synchronizes the shafts causing them to rotate at the same speeds, the engine pistons and the compressor pistons being connected to cranks, the compressor pistons moving in double-acting compressor cylinders, the top and the bottom dead centers of all the pistons being exclusively determined by the rotating crankshafts mounted in such a way as to give a symmetrical motion to each two of the opposed pistons of the engine and of the compressor.

4. A Diesel engine and compressor combination for power-gas which compresses a two-shaft opposed-piston two-stroke Diesel engine, the engine pistons being connected to cranks, the top and the bottom dead centers of the engine pistons being exclusively determined by the rotating crankshafts, said shafts being connected together by a train of gears which synchronizes the shafts causing them to rotate at the same speeds, a separate rotary compressor connected through other gears to the crankshafts and the train of gears which synchronizes the crankshafts, said compressors revolving at a higher speed than the crankshafts, and conduit means for receiving air under pressure from the rotary compressors.

RICHARD BALMER.